Jan. 29, 1929.  
D. C. HERSHBERGER  
1,700,586  
TROLLEY CONDUCTOR EXTENSION  
Filed April 6, 1927
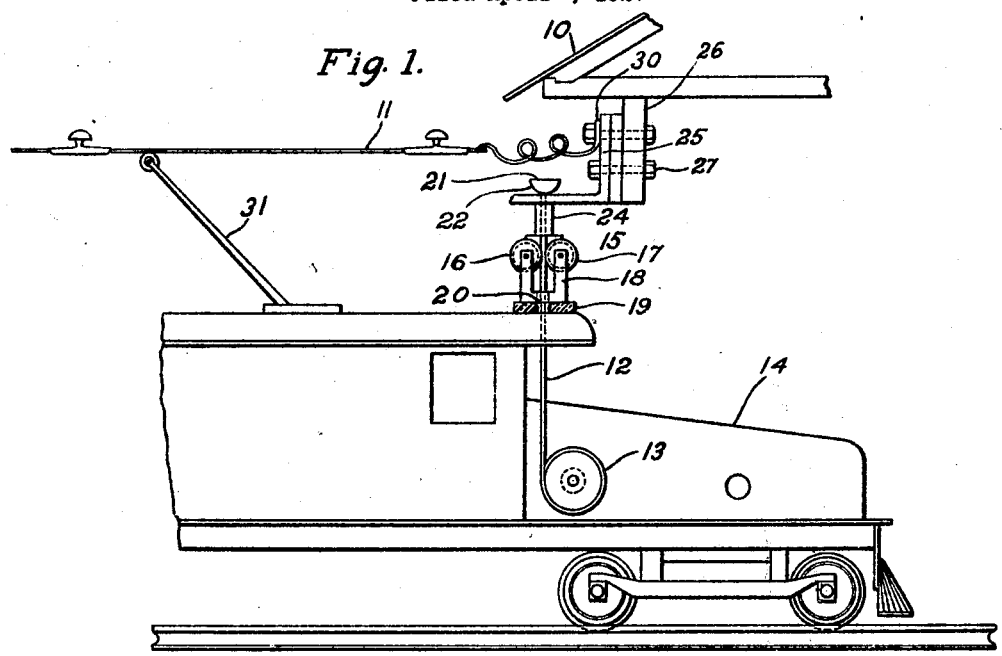
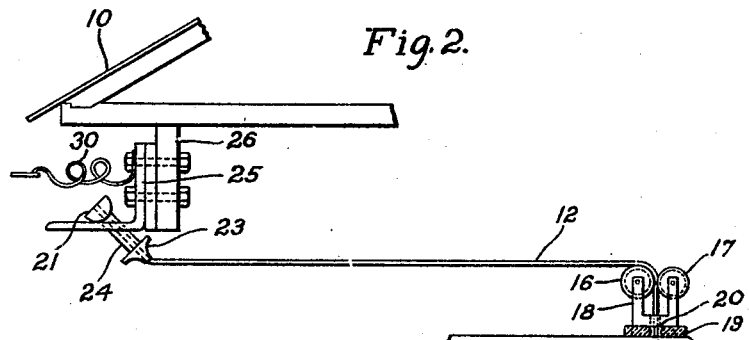
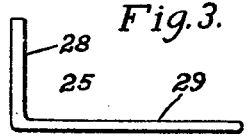
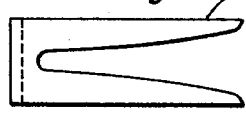
WITNESSES:  
C. J. Weller.  
E. W. Savage
INVENTOR  
David C. Hershberger.  
BY Wesley G. Carr  
ATTORNEY Patented Jan. 29, 1929.

1,700,586

UNITED STATES PATENT OFFICE.

DAVID C. HERSHBERGER, OF TURTLE CREEK, PENNSYLVANIA, ASSIGNOR TO WESTINGHOUSE ELECTRIC & MANUFACTURING COMPANY, A CORPORATION OF PENNSYLVANIA.

TROLLEY-CONDUCTOR EXTENSION.

Application filed April 6, 1927. Serial No. 181,362.

This invention relates generally to trolley-conductor extensions for supplying power to electrically propelled vehicles.

The object of the invention, generally stated, is the provision of a trolley-conductor extension that shall be simple and efficient in operation and readily and economically manufactured.

A more specific object of the invention is to provide for the supply of electrical energy to an electrically propelled vehicle when the latter has been moved beyond the terminus of a trolley conductor.

Another object of the invention is to provide for the automatic attachment of a reeled cable conductor carried by an electrically propelled vehicle to a trolley conductor when the vehicle moves beyond the terminus of the trolley conductor.

Other objects of the invention will, in part, be obvious, and will, in part, appear hereinafter.

The invention, accordingly, as disclosed in the embodiment thereof shown in the accompanying drawing, comprises the structural features, the combination of elements and arrangement of parts that will be exemplified in the structure hereinafter set forth and the scope of the application of which will be indicated in the claims.

For a fuller understanding of the nature and objects of the invention, reference may be had to the following detailed description, taken in conjunction with the accompanying drawing in which, Fig. 1 is a view, in side elevation, of an electrically propelled vehicle provided with a trolley-conductor extension constructed in accordance with this invention, Fig. 2 is a view, in side elevation, of an electrically propelled vehicle provided with a trolley-conductor extension and showing the latter drawn out, Fig. 3 is a side elevational view of a hook constituting a part of the trolley-conductor extension, and Fig. 4 is a top plan view of the hook shown in Fig. 3.

Referring now to the drawings, 10 designates a section of the roof of a car barn, or the like, where electrically propelled vehicles may be stored. As is well known, it is often inadvisable to extend uninsulated trolley conductors into such buildings. Consequently, some provision must be made for supplying power to a vehicle when it is moved into the barn and beyond the terminus of the trolley conductor 11.

In this particular construction, a cable conductor 12, which is wound on a power-operated reel 13, is provided for supplying power to the electrically propelled vehicle 14 when it is in a zone where there is no trolley conductor. Since power-operated reels are well known in the art, it is deemed unnecessary to give a detailed description of the reel 13.

As shown, a cable guide 15 is mounted on the top of the vehicle 14 for supporting the end of the cable conductor 12 in a predetermined position. It will be observed that the guide includes a plurality of sheaves 16 and 17, rotatably mounted in a frame 18. In order to insulate the frame 18 from the vehicle, a plate 19 of insulating material, having an opening 20 therein for the cable, is provided. The plate 19 is mounted between the frame 18 and the roof of the vehicle.

The cable conductor 12 may be of any flexible insulated type commonly provided with mine locomotives. Electrically connected to the end of the cable 12 is a hemispherical head 21 made from some conducting material. While a hemispherical head is illustrated in this particular embodiment of the invention, it will be readily understood that heads presenting contact faces 22 having other curvatures may be utilized.

In order to support the head 21 in a predetermined position, a foot 23, adapted to stand on the sheaves 16 and 17, is provided on the cable 12 and spaced from the head 21. A stiffening member, in the form of a sleeve 24, is mounted on the end of the cable between the head 21 and the foot 23. The member 24 is preferably made from some conducting material and is electrically connected to the cable conductor 12.

As will be observed, the foot 23 is of substantially cone shape. In the preferred form illustrated, the wall of the foot is curved to conform to the curvature of the sheaves.

When such a trolley-conductor extension is provided, it is desirable to provide some means for automatically establishing connection between it and the trolley conductor 11 as the electrically propelled vehicle passes beyond the terminus of the latter. In this construction, the means provided for connecting the conductors 11 and 12 comprises a bifurcated hook 25 suspended from the barn roof 10 at a point adjacent the entrance. As shown, the hook 25 is attached to the block 26 by bolts 27 and, since the block 26 is made from some insulating material, the hook is thereby insulated from the ground.

As shown in Figs. 3 and 4, the hook 25 comprises a vertical section 28 and a horizontal section 29. The vertical section 28 is utilized for attaching the hook to the block 26. The horizontal section 29 is bifurcated, as shown in Fig. 4, to provide prongs for receiving the standing end of the cable 12. It will be readily understood that the hook may be disposed in any desired position to engage the cable 12 as the vehicle passes into the barn.

The trolley conductor 11 is electrically connected to the hook in any suitable manner. As shown, a terminal 30, which is provided on the end of the trolley conductor, is pressed into engagement with the hook 25 by means of one of the bolts 27.

Assuming that an electrically propelled vehicle, provided with a trolley conductor extension, is driven into a barn, when the forward end of the vehicle enters the barn and before the trolley pole 31 reaches the end of the trolley conductor 11, the head 21 on the cable 12 is engaged by the hook 25, and current is supplied to the motors of the vehicle in any well known manner through the cable 12. As the vehicle moves into the barn, the cable conductor 12 is unreeled.

When the vehicle is backed out of the barn, the power-operated reel 13 functions to take up the slack in the cable conductor 12. Further, when the car reaches a predetermined point, the head 21 is withdrawn from the hook 25.

Therefore, a trolley-conductor extension that may be automatically connected when the electrically propelled vehicle moves beyond the terminus of the trolley conductor and disconnected when the vehicle moves within the zone of the trolley conductor, is provided. Thus, provision is made for operating electrically-propelled vehicles in localities where trolleys or other power lines cannot conveniently be erected.

Since certain changes may be made in the above construction, and different embodiments of the invention may be made without departing from the spirit thereof, it is intended that all matter contained in the above description or shown in the accompanying drawing shall be interpreted as illustrative and not in a limiting sense.

I claim as my invention:

1. A power-supply device for electrically propelled vehicles comprising, in combination, a power source, a hook electrically connected to the power source and a cable conductor carried by the vehicle, said conductor being disposed for engagement by the hook when the vehicle is moved under it.

2. A power-delivery device for electrically propelled vehicles comprising, in combination, a trolley conductor, a hook electrically connected to the trolley conductor, a cable conductor carried by the vehicle and means for supporting the cable conductor in position to be engaged by the hook when the vehicle moves beyond the terminus of the trolley conductor.

3. A power-delivery device for electrically propelled vehicles comprising, in combination, a trolley conductor, a hook disposed at the end of the trolley conductor, said hook and trolley conductor being electrically connected, and a reeled cable conductor carried by the vehicle, said cable conductor being disposed for engagement by the hook when the vehicle moves beyond the end of the trolley conductor.

4. A power-delivery device for electrically propelled vehicles comprising, in combination, a trolley conductor, a hook electrically connected to the trolley conductor, a reeled cable conductor carried by the vehicle, said hook being bifurcated to engage the cable conductor to draw it out, thereby to provide for the supply of current to the vehicle when it has moved beyond the end of the trolley conductor.

5. In a trolley-conductor extension for electrically propelled vehicles, in combination, a reeled cable conductor carried by a vehicle and a bifurcated hook electrically connected to the trolley conductor and disposed to engage the cable conductor and to draw it out as the vehicle passes beyond the end of the trolley conductor.

6. In a trolley-conductor extension for electrically propelled vehicles, in combination, a bifurcated hook electrically connected to the trolley conductor, a reeled cable carried by a vehicle and a hemispherical head provided on the cable and disposed to be engaged by the hook to draw the cable out as the vehicle passes beyond the end of the trolley conductor.

7. In a trolley-conductor extension for electrically propelled vehicles, in combination, a trolley conductor, a reeled cable conductor carried by the vehicle and means for automatically establishing electrical connection between the cable conductor and the trolley conductor.

8. A trolley-conductor extension for the electrically propelled vehicles comprising, in combination, a reeled cable conductor, mechanical means operative to establish electrical connection between the trolley-conductor and the cable conductor when the vehicle moves beyond the end of the trolley-conductor and for causing a drawing out of the cable.

In testimony whereof, I have hereunto subscribed my name this 31st day of March, 1927.

DAVID C. HERSHBERGER.